(12) United States Patent
Kluwe et al.

(10) Patent No.: US 7,689,090 B2
(45) Date of Patent: Mar. 30, 2010

(54) CABLE SLEEVE FOR THE STRUCTURED STORAGE AND HANDLING OF OPTICAL WAVEGUIDES GUIDED IN OPTICAL WAVEGUIDE CABLES

(75) Inventors: Wolf Kluwe, Iserlohn (DE); Roman Arnold Theodor Syplacz, Hagen (DE); Thorsten Müller, Menden (DE); Oliver Lapp, Wuppertal (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 12/323,587

(22) Filed: Nov. 26, 2008

(65) Prior Publication Data

US 2009/0103877 A1    Apr. 23, 2009

Related U.S. Application Data

(63) Continuation of application No. PCT/EP2007/004477, filed on May 19, 2007.

(30) Foreign Application Priority Data

May 30, 2006    (DE)    .................. 20 2006 008 655 U

(51) Int. Cl.
   *G02B 6/00*    (2006.01)
(52) U.S. Cl. .................... 385/135; 385/134; 385/138
(58) Field of Classification Search ................ 385/135, 385/138
   See application file for complete search history.

(56) References Cited

U.S. PATENT DOCUMENTS

| | | | | |
|---|---|---|---|---|
| 5,097,529 A | * | 3/1992 | Cobb et al. ................. | 385/135 |
| 5,446,823 A | * | 8/1995 | Bingham et al. ............ | 385/135 |
| 5,455,391 A | | 10/1995 | Demesmaeker et al. ....... | 174/93 |
| 5,479,554 A | * | 12/1995 | Roberts ...................... | 385/135 |
| 5,553,186 A | * | 9/1996 | Allen ......................... | 385/135 |
| 5,556,060 A | * | 9/1996 | Bingham et al. ............. | 248/49 |
| 5,652,820 A | * | 7/1997 | Glaser et al. ................ | 385/135 |
| 5,758,004 A | | 5/1998 | Alarcon et al. ............. | 385/135 |
| 5,764,844 A | * | 6/1998 | Mendes ...................... | 385/135 |
| 5,774,618 A | * | 6/1998 | Jones ......................... | 385/135 |
| 6,052,504 A | * | 4/2000 | Frohlich et al. ............. | 385/134 |
| 6,292,614 B1 | * | 9/2001 | Smith et al. ................. | 385/135 |
| 6,344,615 B1 | * | 2/2002 | Nolf et al. ................... | 174/92 |

(Continued)

FOREIGN PATENT DOCUMENTS

DE    19728370    1/1999

(Continued)

*Primary Examiner*—Ryan Lepisto
(74) *Attorney, Agent, or Firm*—John H. Vynalek

(57) ABSTRACT

A cable sleeve for the structured storage and handling of optical waveguides guided in optical waveguide cables is disclosed. The cable sleeve comprises a covering body defining an interior. A sealing body comprising two dimensionally stable end pieces and a compressible gel element arranged between the end pieces is adapted to be insert into an opening of the covering body and operable for feeding optical waveguide cables into the interior and/or for feeding optical waveguide cables out of the interior. Spring elements are integrated into the interior of a covering body. When the sealing body is inserted into the opening of the covering body and compressed, the spring elements bear against one of the dimensionally stable end pieces of the sealing body and exert a compression force onto the gel element.

9 Claims, 6 Drawing Sheets

U.S. PATENT DOCUMENTS

| | | | |
|---|---|---|---|
| 6,411,767 B1 * | 6/2002 | Burrous et al. | 385/135 |
| 6,533,472 B1 * | 3/2003 | Dinh et al. | 385/95 |
| 6,628,880 B2 * | 9/2003 | Roberts | 385/135 |
| 6,802,512 B2 * | 10/2004 | Muller et al. | 277/607 |
| 6,856,747 B2 * | 2/2005 | Cloud et al. | 385/135 |
| 7,045,710 B1 * | 5/2006 | Allen et al. | 174/50 |
| 7,308,183 B2 * | 12/2007 | Kowalczyk et al. | 385/135 |
| 7,330,628 B1 * | 2/2008 | Kowalczyk et al. | 385/135 |

FOREIGN PATENT DOCUMENTS

| | | |
|---|---|---|
| DE | 10010452 | 6/2001 |
| EP | 0646294 | 11/1996 |
| EP | 0841734 | 5/1998 |
| FR | 2748867 | 11/1997 |
| WO | WO92/22113 | 12/1992 |
| WO | WO92/22114 | 12/1992 |
| WO | WO93/26069 | 12/1993 |
| WO | WO96/30794 | 10/1996 |
| WO | WO98/08125 | 2/1998 |
| WO | WO99/33154 | 7/1999 |
| WO | WO99/56370 | 11/1999 |

* cited by examiner

CABLE SLEEVE FOR THE STRUCTURED STORAGE AND HANDLING OF OPTICAL WAVEGUIDES GUIDED IN OPTICAL WAVEGUIDE CABLES

CROSS-REFERENCE TO RELATED APPLICATIONS

This application is a continuation of International Application No. PCT/EP2007/004477, filed May 19, 2007, which claims priority to German Application No. DE202006008655.2, filed May 30, 2006, both applications being incorporated herein by reference.

BACKGROUND

1. Technical Field

The invention relates to a cable sleeve for the structured storage and handling of optical waveguides guided in optical waveguide cables.

2. Technical Background

Cable sleeves for the structured storage and handling of optical waveguides guided in optical waveguide cables are used in optical waveguide cable networks for protecting spliced connections at connecting points of two optical waveguide cables and for protecting optical waveguides at branch-off points or at dividing points of optical waveguide cables. In doing so, the cable sleeves must guarantee the continuity of the optical waveguide cables as if the optical waveguide cables were not interrupted. Great importance is attached here to the structured storage and gentle handling of the optical waveguides so that the transmission characteristics of the optical waveguides are not negatively affected.

A cable sleeve is disclosed in EP 0 646 294 B1. The cable sleeve disclosed here comprises a covering body and a sealing body that can be fed into an opening of the covering body, the sealing body comprising a gel-like sealing material, which is arranged between two dimensionally stable plates. According to EP 0 646 294 B1, the sealing body can be slid in and out in a hollow cavity in the axial direction with respect to the covering body in order to compensate for pressure differences between an internal pressure and an external pressure of the cable sleeve. In doing so, the sealing body comes to bear against different stops depending on this pressure difference.

A further cable sleeve is disclosed in U.S. Pat. No. 5,455, 391, which likewise comprises a sealing body, which comprises two dimensionally stable end pieces and a compressible gel element arranged between the two end pieces. According to U.S. Pat. No. 5,455,391, the gel element is pierced by clamping elements, which press the two dimensionally stable end pieces against one another.

SUMMARY

According to one aspect, a cable sleeve for the structured storage and handling of optical waveguides guided in optical waveguide cables is provided. Spring elements are integrated into the interior of the covering body and, when the sealing body is inserted into the opening of the covering body and compressed, bear against one of the dimensionally stable end pieces of the sealing body and exert a compression force onto the gel element.

The cable sleeve is distinguished by a simple structure. Optical waveguide cables to be fed into the cable sleeve or removed therefrom can be easily sealed. The sealing results from compressing the gel element and the spring elements. The spring elements integrated in the covering body provide a compression force for the gel element in order to guarantee a good sealing effect of the gel element even in the event of a change in the behavior thereof due to temperature. In doing so, the spring elements bear against a dimensionally stable end piece of the sealing body, namely without penetrating the gel element. The spring elements store the force applied when locking the cable sleeve and subject the gel element of the sealing body to the compression force.

The inserted position or fitted position of the sealing body relative to the covering body is determined by at least one projection associated with the sealing body and at least one recess associated with the covering body in such a way that when the cable sleeve is assembled the or each projection of the sealing body engages in a corresponding recess of the covering body.

At least one locking body holds the sealing body in its inserted position or fitted position in the covering body and presses said sealing body against the spring elements integrated in the covering body and against projections on an inner surface of the covering body in which the spring elements are accommodated.

BRIEF DESCRIPTION OF THE FIGURES

Exemplary embodiments of the invention, without being restricted thereto, are described in more detail with reference to the drawing. In the drawings.

DETAILED DESCRIPTION

Figure 6:
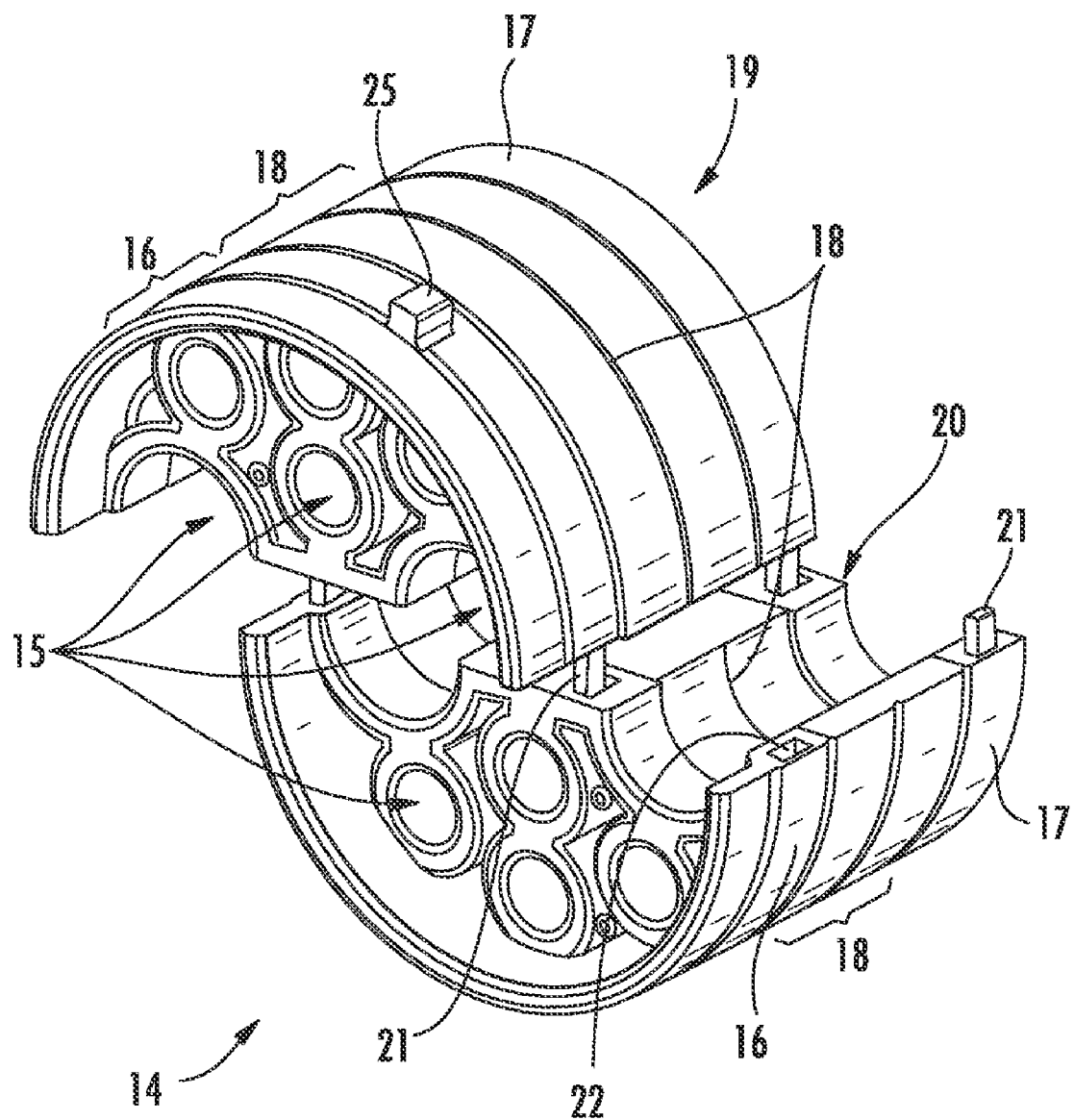
FIG. 6 shows a sealing body of the cable sleeve according to the invention as shown in FIGS. 1 and 2 in perspective exploded view.
Figure 7:
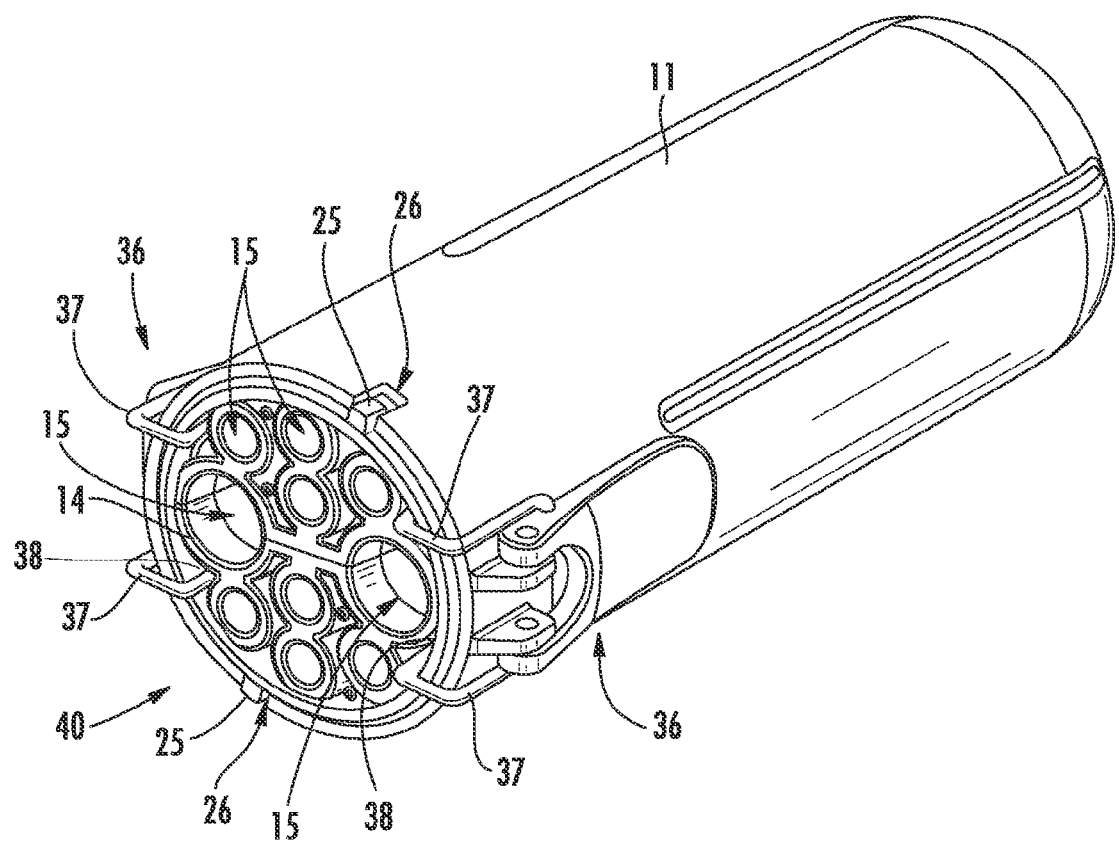
FIG. 7 shows a cable sleeve according to the invention for the structured storage and handling of optical waveguides guided in optical waveguide cables designed in the form of a hood sleeve according to a second exemplary embodiment of the invention in perspective view.

Referring now to FIGS. 1 to 7, a cable sleeve for the structured storage and handling of optical waveguides guided in optical waveguide cables designed in the form of a hood sleeve is shown. FIGS. 1 to 6 relate to a first exemplary embodiment of the invention; FIG. 7 shows a second exemplary embodiment of the cable sleeve according to the invention. The cable sleeve may be used with hood sleeves, and may also be used with any other types of sleeve, for example, without limitation, with so-called in-line sleeves.

Figure 1:
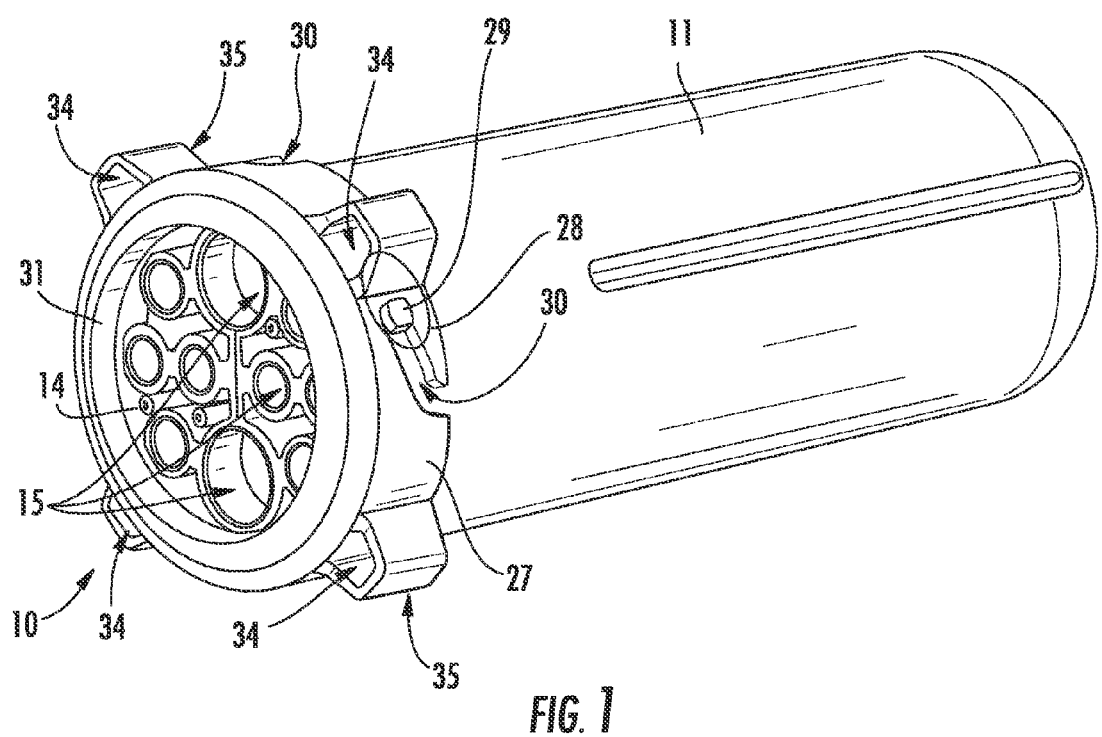
FIG. 1 shows a cable sleeve according to the invention for the structured storage and handling of optical waveguides guided in optical waveguide cables designed in the form of a hood sleeve according to a first exemplary embodiment of the invention in perspective view.
Figure 2:
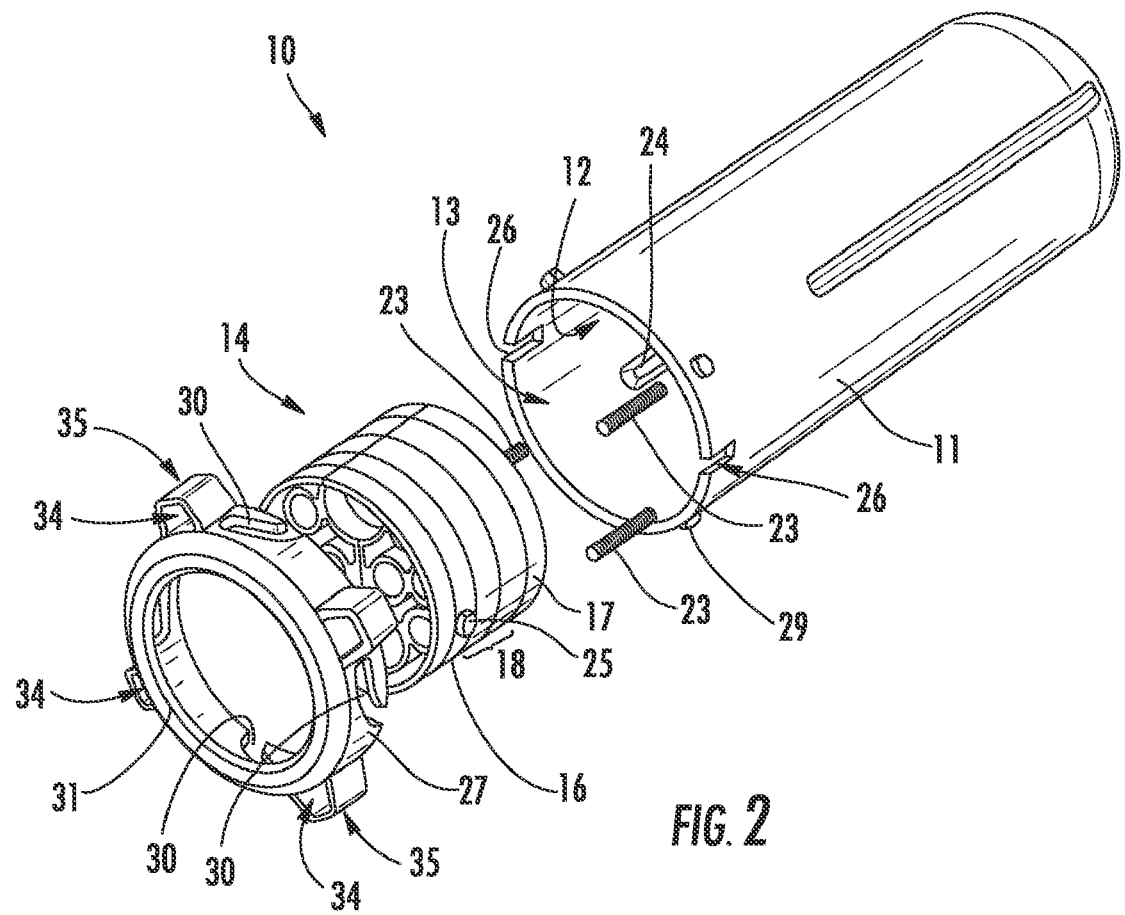
FIG. 2 shows the cable sleeve according to the invention as shown in FIG. 1 in perspective exploded view.

FIG. 1 shows a cable sleeve 10 according to the invention according to a first exemplary embodiment of the invention in the assembled state; an exploded view of the cable sleeve shown in FIG. 1 can be seen in FIG. 2. The cable sleeve 10 of FIGS. 1 and 2 according to the invention is designed in the form of a hood sleeve and has a covering body 11 designed in the form of a covering hood, which according to FIG. 2 defines an interior 12 of the cable sleeve 10. A sealing body 14 can be inserted in an opening 13 of the covering body 11, wherein on the one hand optical waveguide cables can be fed into the interior 12 of the cable sleeve 10 and on the other hand said optical waveguide cables can be fed out of the interior 12 via the sealing body 14.

The optical waveguide cables are fed into and out of the interior 12 of the cable sleeve 10 by means of openings 15 integrated in the sealing body 14. The covering body 11 of the cable sleeve 10 according to the invention is shown by itself in FIGS. 4 and 5. FIG. 6 shows the sealing body 14 likewise by itself, namely in an exploded view.

The sealing body 14 of the cable sleeve 10 according to the embodiment has two dimensionally stable end pieces 16 and 17, between which is arranged a compressible gel element 18. As can be seen from FIG. 6, the sealing body 14 is designed in two parts and is accordingly made up of two halves 19 and 20. In the assembled state of the cable sleeve 10, the separation plane of the sealing body 14 hereby runs in the longitudinal direction of the cable sleeve 10 or in the longitudinal direction of the covering body 11. According to FIG. 6, the two halves 19 and 20 of the sealing body 14 have projections 21 and recesses 22 respectively, wherein, when the sealing body 14 is made up of the two halves 19 and 20, the projections 21 of one half 19 or 20 respectively engage in a recess 22 of the corresponding other half 20 or 19 respectively.

Spring elements 23 are integrated into the covering body 11 or into the interior 12 thereof. In doing so, the spring elements 23 are accommodated in projections 24 formed on an inner side or inner surface of the covering body 11. The projections 24 stand radially inwards around the inner surface of the covering body 11 and accordingly protrude into the interior 12. In the assembled state of the cable sleeve 10 according to the invention, namely when the sealing body 14 is inserted in the opening 13 of the covering body 11, a dimensionally stable end piece of the sealing body 14, namely the inner end piece 17, bears against the spring elements 23 and the projections 24. The projections 24 form stops for the sealing body 14 and limit the insertion depth thereof into the covering body 11. The spring elements 23 store the force applied when locking the cable sleeve 10 and hold the gel element 18 of the sealing body 14 under compression force. As a result of this, on the one hand, optical waveguide cables fed into or out of the cable sleeve 11 via the openings 15 of the sealing body 14 are sealed, and on the other the sealing body 14 is sealed with respect to the covering body 11 of the cable sleeve 10 according to the invention.

According to FIG. 2, the fitted position of the sealing body 14 in the covering body 11 is defined by projections 25, which are associated with the sealing body 14 and which can be inserted into slot-like recesses 26 of the covering body 11. At the same time, a projection 25 of this kind is associated with each half 19 and 20 of the sealing body 14, wherein each of the two projections 25 can be inserted into a slot-like recess 26 of the covering body 11 in each case. According to FIGS. 2 and 6, the projections 25 are associated with the outer dimensionally stable end piece 16 of the sealing body 14 in the assembled position of the cable sleeve 10.

In the exemplary embodiment of FIGS. 1 to 4, the cable sleeve 10 according to the invention has a locking body 27 designed in the form of a locking cap, which locks the cable sleeve 10 and fixes the sealing body 14 to the covering body 11. In the exemplary embodiment shown, the locking body 27, which is designed in the form of a locking cap, can be fixed by means of a bayonet-like locking mechanism 28 on the covering body 11, wherein the bayonet-like locking mechanism 28 is formed from projections 29, which are formed on an outer surface of the covering body 11, together with slot-like recesses 30 in the vicinity of the locking body 27. At the same time, the projections 29 of the covering body 11 can be inserted in the recesses 30 of the locking body 27, wherein the locking body 27 can then be twisted with respect to the covering body 11. After twisting the locking body 27 relative to the covering body 11, the projections 29 engage in corresponding undercuts of the recesses 30 as shown in FIG. 1.

The slot-like recesses 30 of the locking body 27 run in a sloping manner, namely in such a way that, when it is twisted, the locking body 27 executes a screw-like relative movement with respect to the covering body 11 and thereby presses the sealing body 14 against the projections 24 and the spring elements 23. This provides the compression force required to deform the gel element 18 of the sealing body 14.

When the cable sleeve 10 is assembled or put together, the sealing body 14 is accordingly inserted into the opening 13 of the covering body 11, wherein the projections 24, which act as stops, limit the insertion depth of the sealing body 14 in the covering body 11. When the sealing body 14 bears with the inner end piece 17 against the projections 24 in the uncompressed state, said sealing body then stands at least partially around the covering body 11 with the outer end piece 16, or protrudes at least partially therefrom. The locking body 27 is screwed to the covering body 11 in the manner of a bayonet, wherein in this case the gel element 18 of the sealing body 14 is compressed due to the fact that the sealing body 14 bears with the inner end piece 17 against the projections 24. At the same time, the spring elements 23, which are accommodated in the projections 24 and which store the force applied to lock the cable sleeve 10, are also compressed and hold the gel element 18 of the sealing body 14 under compression force. This enables a change in the behavior of the gel element 18 due to temperature to be balanced or compensated for and a good sealing action thereof to be guaranteed.

According to FIGS. 1 and 2, the locking body 27, which is designed in the form of a locking cap, is designed to be open on its face side in such a way that the openings 15 of the sealing body 14 are not covered. The outer dimensionally stable end piece 16 of the sealing body 14 in the assembled state of the cable sleeve 10 thereby comes to bear against a circumferential edge 31 of the locking body 27.

Figure 3:
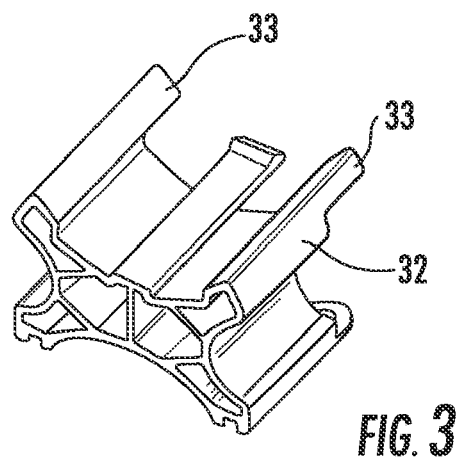
FIG. 3 shows a retaining bracket for the cable sleeve according to the invention as shown in FIGS. 1 and 2.
Figure 4:
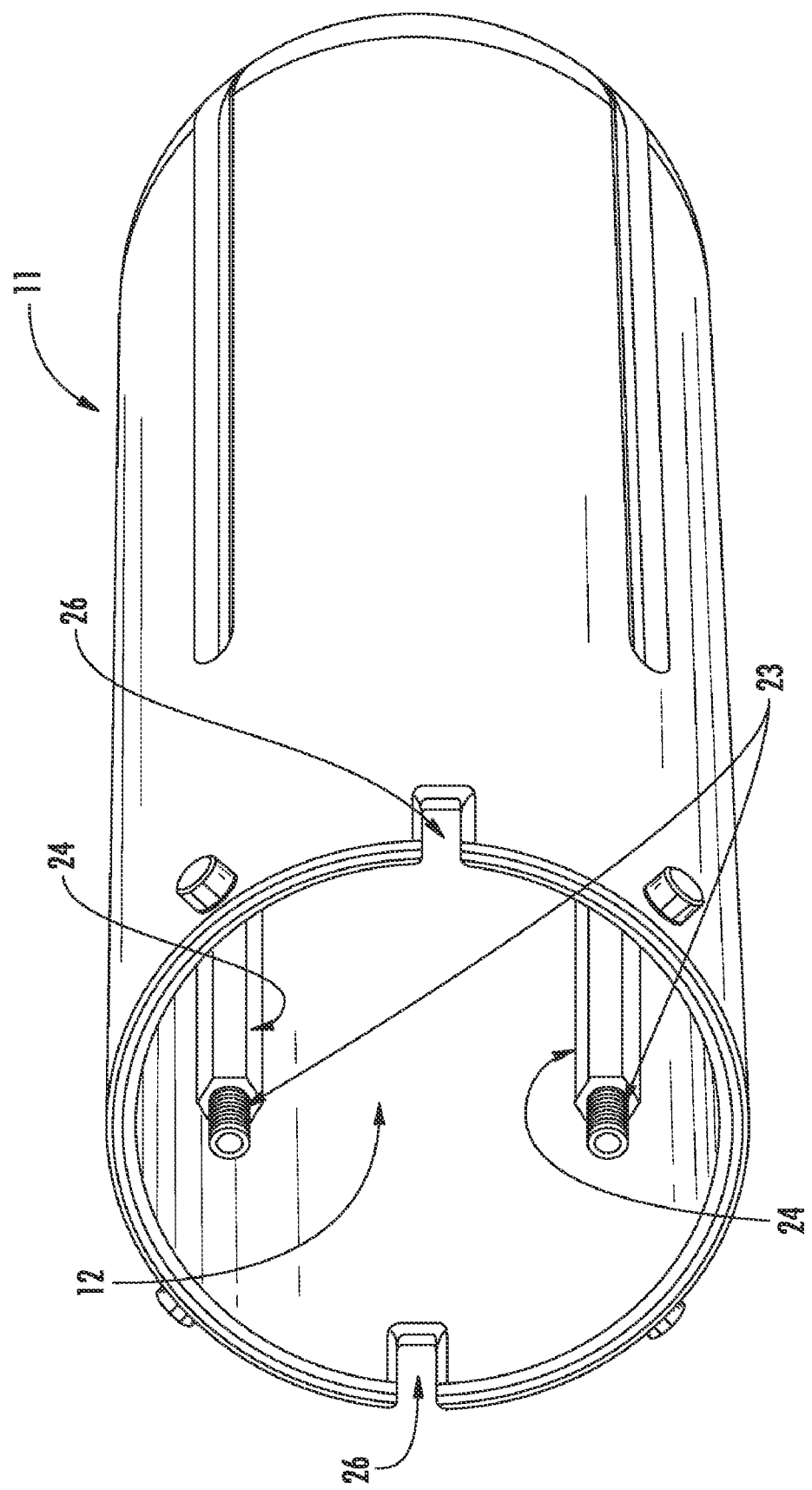
FIG. 4 shows a covering hood of the cable sleeve according to the invention as shown in FIGS. 1 and 2 in perspective view.
Figure 5:
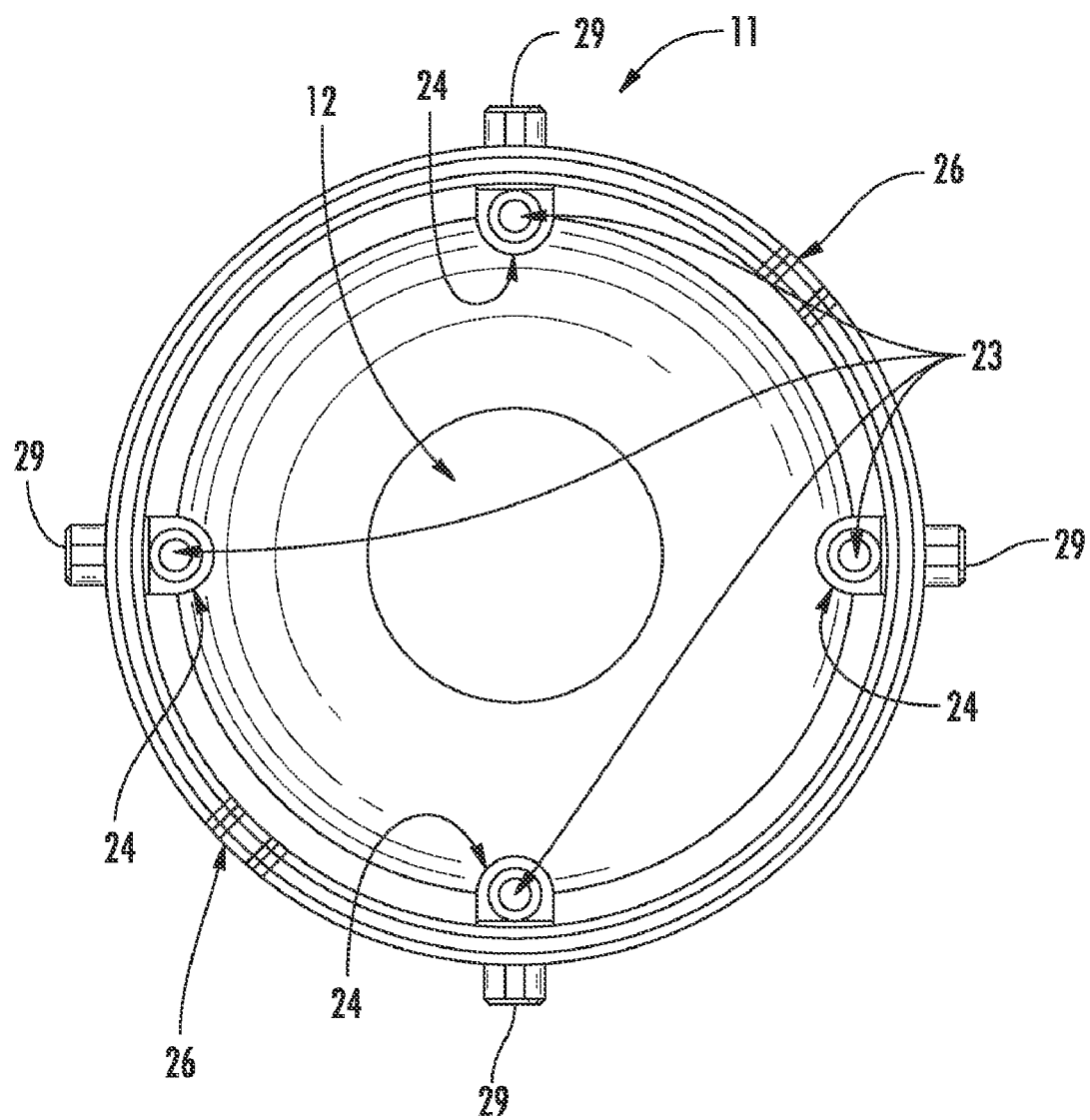
FIG. 5 shows the covering hood of FIG. 4 in front view.

The cable sleeve 10 of the exemplary embodiment of FIGS. 1 and 2 can be fixed to a mast or wall by means of a retaining bracket 32 shown in FIG. 3, wherein bar-like projections 33 of the retaining bracket 32 can be inserted in recesses 34 of the locking body 27 for this purpose. Here, the recesses 34 are made in radial projections 35 on the outside of the locking body 27.

FIG. 7 shows a second exemplary embodiment of a cable sleeve 40 according to the invention, which differs from the exemplary embodiment of FIGS. 1 to 6 only in the design of the locking body. To avoid unnecessary repetition, the same reference numbers are therefore used for the same assemblies, and reference is made to the comments relating to the example of FIGS. 1 to 6. Only the details in which the exemplary embodiment of FIG. 7 differs from the exemplary embodiment of FIGS. 1 to 6 are discussed below.

As already mentioned, the exemplary embodiment of FIG. 7 differs from the exemplary embodiment of FIGS. 1 to 6 only in the design of the locking body, two locking bodies 36, which are designed in the form of locking clips, being provided in the exemplary embodiment of FIG. 7. According to FIG. 7, hooks 37 of the locking clips 36 can be inserted in recesses 38 of the sealing body 14, wherein, in the closed position of the locking clips 36 shown in FIG. 7, the hooks 37 press the sealing body 14 against the spring elements 23 and projections 24 integrated in the covering body 11.

According to FIG. 7, the hooks 37 engage in openings 38, which are formed on the outer dimensionally stable end piece 16 of the sealing body 14 in the assembled state. Accordingly, in the assembled state of the cable sleeve 40, the sealing body 14 is fixed in the covering body 11 by means of the locking clips 36, and furthermore the compression force, which is required to compress the gel element 18 of the sealing body 14 and which is stored by the spring elements 23 and exerted on the sealing body 14, is provided by the locking clips 36.

What is claimed is:

1. A cable sleeve for the structured storage and handling of optical waveguides guided in optical waveguide cables, comprising:
   a covering body defining an interior;
   a sealing body comprising two dimensionally stable end pieces and a compressible gel element arranged between the end pieces, wherein the sealing body is adapted to be inserted into an opening of the covering body and operable for feeding optical waveguide cables into the interior and/or for feeding optical waveguide cables out of the interior; and
   spring elements integrated into the interior of the covering body and, wherein when the sealing body is inserted into the opening of the covering body and compressed, the spring elements bear against one of the dimensionally stable end pieces of the sealing body and exert a compression force onto the gel element.

2. The cable sleeve of claim 1, wherein the spring elements bear against an inner dimensionally stable end piece of the sealing body.

3. The cable sleeve of claim 1, further comprising at least one projection associated with the sealing body and at least one recess associated with the covering body, wherein an inserted position or fitted position of the sealing body relative to the covering body is determined by the at least one projection and the at least one recess such that when the cable sleeve is assembled the at least one projection engages the at least one recess of the covering body.

4. The cable sleeve of claim 1, wherein the sealing body comprises two parts such that a separation plane thereof runs in a longitudinal direction of the cable sleeve.

5. The cable sleeve of claim 1, further comprising at least one locking body, wherein the at least one locking body holds the sealing body in an inserted position or a fitted position in the covering body and presses the sealing body against the spring elements.

6. The cable sleeve of claim 5, wherein the locking body is designed in the form of a locking cap and comprises bayonet-like locking mechanism, and wherein the locking cap is adapted to be fixed by means of a bayonet-like locking mechanism on the covering body.

7. The cable sleeve as claimed in claim 5, wherein the locking body is designed in the form of locking clips, wherein the locking clips engage on one of an outer dimensionally stable end piece of the sealing body when the cable sleeve is assembled, and fix the sealing body in the covering body.

8. The cable sleeve of claim 1, further comprising projections formed on an inner surface of the covering body, wherein the spring elements are accomodated in the projections, and wherein the projections stand radially inwards around the inner surface of the covering body and protrude into the interior.

9. The cable sleeve of claim 8, further comprising wherein the projections restrict the insertion depth of the sealing body into the interior of the covering body, and wherein the locking body presses the sealing body against the projections and compresses the sealing body and the spring elements, and wherein the spring elements store the force applied via the locking body and exert a compression force on the gel element.

* * * * *